US011332892B2

(12) United States Patent
Conrad et al.

(10) Patent No.: US 11,332,892 B2
(45) Date of Patent: May 17, 2022

(54) PATIO BLOCKS AND METHOD OF PROVIDING A UV COATING

(71) Applicant: Omachron Intellectual Property Inc., Hampton (CA)

(72) Inventors: Wayne Ernest Conrad, Hampton (CA); Nina Conrad, Hampton (CA); Dave Petersen, Bowmanville (CA)

(73) Assignee: Omachron Intellectual Property Inc., Hampton (CA)

( * ) Notice: Subject to any disclaimer, the term of this patent is extended or adjusted under 35 U.S.C. 154(b) by 148 days.

(21) Appl. No.: 16/540,560

(22) Filed: Aug. 14, 2019

(65) Prior Publication Data

US 2021/0047787 A1   Feb. 18, 2021

(51) Int. Cl.
| | | |
|---|---|---|
| *E05C 5/00* | (2006.01) | |
| *E01C 5/20* | (2006.01) | |
| *E04F 15/02* | (2006.01) | |
| *B29C 39/12* | (2006.01) | |
| *E01C 5/00* | (2006.01) | |
| *A01N 1/00* | (2006.01) | |

(52) U.S. Cl.
CPC .............. *E01C 5/20* (2013.01); *B29C 39/123* (2013.01); *E04F 15/02* (2013.01); *A01N 1/00* (2013.01); *E01C 5/005* (2013.01); *E01C 2201/12* (2013.01); *E01C 2201/14* (2013.01)

(58) Field of Classification Search
CPC ..................................... E01C 5/00; E01C 5/20
See application file for complete search history.

(56) References Cited

U.S. PATENT DOCUMENTS

| | | | | |
|---|---|---|---|---|
| 2,658,015 A | * | 11/1953 | Williams | ............... B29C 63/02 |
| | | | | 428/452 |
| 2,918,151 A | | 12/1959 | Kennedy | |
| 4,167,599 A | | 9/1979 | Nissinen | |
| 4,680,907 A | * | 7/1987 | Williams | ............... E04B 1/642 |
| | | | | 4/614 |
| 4,963,054 A | | 10/1990 | Hayashi | |
| 5,302,049 A | * | 4/1994 | Schmanski | ............... E01C 5/20 |
| | | | | 404/15 |
| 5,323,575 A | | 6/1994 | Yeh | |
| 5,443,545 A | | 8/1995 | Weber | |
| 5,477,654 A | * | 12/1995 | Weelink | ................... A01K 1/01 |
| | | | | 119/451 |
| 5,487,526 A | | 1/1996 | Hupp | |
| 5,527,128 A | | 6/1996 | Rope et al. | |
| 5,612,081 A | * | 3/1997 | Orr | ........................ B05D 5/02 |
| | | | | 118/117 |

(Continued)

FOREIGN PATENT DOCUMENTS

GB           2030891 A  *  4/1980  ......... B29C 66/0222

*Primary Examiner* — Cachet I Proctor
(74) *Attorney, Agent, or Firm* — Philip C. Mendes da Costa; Bereskin & Parr LLP/S.E.N.C.R.L., s.r.l

(57) ABSTRACT

A method for treating a plastic block comprising using heat to embed a UV resistant material into an outer face of the plastic block wherein, once embedded, the UV resistant material provides a coating on the outer face. A method for treating a plastic block comprising using compressive force to embed a UV resistant material into an outer face of the plastic block wherein, once embedded, the UV resistant material provides a coating on the outer face.

22 Claims, 17 Drawing Sheets

(56) References Cited

U.S. PATENT DOCUMENTS

| | | | |
|---|---|---|---|
| 5,613,339 A * | 3/1997 | Pollock | B63B 3/48 |
| | | | 52/836 |
| 5,645,701 A * | 7/1997 | Dufresne | C25C 7/00 |
| | | | 204/288.1 |
| 5,833,386 A | 11/1998 | Rosan et al. | |
| 6,044,598 A * | 4/2000 | Elsasser | E01C 5/20 |
| | | | 52/177 |
| 6,221,445 B1 | 4/2001 | Jones | |
| 6,594,961 B2 | 7/2003 | Leines | |
| 7,114,298 B2 | 10/2006 | Kotler | |
| 7,344,334 B2 | 3/2008 | Thorkelson | |
| 7,637,688 B2 | 12/2009 | Riccobene | |
| 7,950,191 B2 | 5/2011 | Brouwers | |
| 7,955,025 B2 | 6/2011 | Murphy et al. | |
| 8,282,311 B2 | 10/2012 | Chow | |
| 8,807,865 B1 | 8/2014 | Modrono | |
| 9,010,060 B2 | 4/2015 | Rapaz | |
| 9,528,277 B2 | 12/2016 | Prati | |
| 9,670,624 B1 | 6/2017 | Stiles | |
| 10,036,559 B2 | 7/2018 | Szekely | |
| 10,066,343 B2 | 9/2018 | Gasparovic et al. | |
| 10,094,073 B2 | 10/2018 | Barth et al. | |
| 2002/0050233 A1 * | 5/2002 | Balkum | C04B 38/0038 |
| | | | 106/803 |
| 2003/0136070 A1 | 7/2003 | Ku | |
| 2007/0269265 A1 * | 11/2007 | Thorkelson | E01C 5/18 |
| | | | 404/34 |
| 2009/0241450 A1 * | 10/2009 | Italiane | E04D 1/08 |
| | | | 52/309.3 |
| 2010/0263114 A1 * | 10/2010 | Nagy | A47K 17/028 |
| | | | 4/254 |
| 2017/0067210 A1 * | 3/2017 | Gasparovic | C09D 5/00 |
| 2017/0167084 A1 | 6/2017 | Sawyer et al. | |
| 2018/0371705 A1 | 12/2018 | MacDonald et al. | |

* cited by examiner

PATIO BLOCKS AND METHOD OF PROVIDING A UV COATING

FIELD

This disclosure relates generally to blocks such as patio pavers, and in particular to blocks having a coating of an ultraviolet-resistant material.

INTRODUCTION

The following is not an admission that anything discussed below is part of the prior art or part of the common general knowledge of a person skilled in the art.

Various types of blocks are known, including patio pavers and other outdoor surface blocks and including blocks comprising recycled or virgin plastics or metals. Further, various designs for blocks are known in the art.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

In accordance with one aspect of this disclosure, which may be used alone or in combination with any other aspect, a plastic block may be treated using heat to embed a UV resistant material. A plastic block such as a patio paver may be exposed to prolonged UV radiation, which may result in deterioration of the block. Embedding a UV resistant material may provide a degree of protection from degradation due to UV radiation. Treatment using heat may result in at least a portion of the plastic block being softened so as to facilitate embedding of the UV resistant material in a top (outer exposed when installed) face.

The coating may be applied to an existing walking surface (e.g., a patio or sidewalk). Accordingly, an existing patio may be rejuvenated by applying the coating. The UV coating may also be used to adjust (change) the colour of the exposed surface of the patio. In particular, the coating material may be selected to provide a desired colour on the treated patio blocks. Alternately, or in addition, the coating which is applied may be used to only change the colour and may not add significant UV protection.

The UV resistant material may be embedded into an outer face of the plastic block as a coating on the outer face. Embedding the UV resistant material as a coating may simplify treating an installed patio since only the top surface of the blocks need to be available for treatment.

Examples of UV resistant material include sand, titanium dioxide, crushed glass, a metallic powder, pumice, a UV stabilized plastic, concrete particulate material and pebbles. Optionally, the UV coating consists of or consists essentially of sand. A UV resistant material coating may also result in a more textured or natural surface of the plastic block.

In accordance with this broad aspect, there is provided a method for treating a plastic block comprising using heat to embed a UV resistant material into an outer face of the plastic block wherein, once embedded, the UV resistant material provides a coating on the outer face.

In any embodiment, the outer face may be first heated to a temperature at which the UV resistant material is embeddable in the outer face and then the UV resistant material is embedded into the outer face.

In any embodiment, the UV resistant material may be provided on the outer face once the outer face has been heated to a temperature at which the UV resistant material is embeddable in the outer face.

In any embodiment, the outer face may be heated to a temperature at which the UV resistant material is embeddable in the outer face but below the melting point of the plastic block.

In any embodiment, the outer face may be heated to a temperature which is from 40 to 5° C. below the melting point of the plastic block.

In any embodiment, only the upper portion of the plastic block, which comprises the outer face, may be heated to a temperature about or above the melting point of the plastic block.

In any embodiment, only the upper 10% of the height of the plastic block, which comprises the outer face, may be heated to a temperature about or above the melting point of the plastic block.

In any embodiment, the upper portion of the plastic block may be subjected to heating for up to 10 seconds to heat the upper portion to a temperature about or above the melting point of the plastic block.

In any embodiment, the UV resistant material may be provided on the outer face once the outer face has been heated.

In any embodiment, the UV resistant material may be heated to obtain heated UV resistant material and the method may further comprise providing the heated UV resistant material to the outer face. In such an embodiment, the heated UV resistant material may provide at least 75% of the heat or may provide at least substantially all of the heat.

In any embodiment, the UV resistant material may be pressed into the outer face.

In any embodiment, the UV resistant material may be delivered under force to the outer face.

In any embodiment, the UV resistant material may be conveyed by an air stream to the outer face.

In any embodiment, the air stream may be produced by a compressed gas.

In any embodiment, the UV resistant material may be ejected from an apparatus towards the outer face.

In any embodiment, the method may further comprise selecting the UV resistant material from sand, titanium dioxide, crushed glass, a metallic powder, pumice, a UV stabilized plastic, concrete particulate material and pebbles.

In any embodiment, the UV resistant material may comprise sand.

In accordance with another aspect of this disclosure, which may be used alone or in combination with any other aspect, it may be desirable to treat a plastic block using compressive force to embed a UV resistant material into an outer face of the plastic block. This may reduce or eliminate the need for heat.

In accordance with this broad aspect, there is provided a method for treating a plastic block comprising using compressive force to embed a UV resistant material into an outer face of the plastic block wherein, once embedded, the UV resistant material provides a coating on the outer face.

In accordance with another aspect of this disclosure, which may be used alone or in combination with any other aspect, a plastic block may be formed with a UV coating applied only to the face with will be the outer (exposed) face when the block is installed to form a walking surface. Embedding the UV resistant material as a coating may allow the block to comprise materials such as mixed or recycled plastics having a lower UV resistance than the UV resistant material.

In accordance with this aspect of this disclosure, a plastic block may be molded with a UV resistant material forming a coating on an outer face of the plastic block. Molding a plastic block may include placing a UV resistant material into a side of a mold which forms an outer face of the plastic block, introducing plastic into the mold, and molding the plastic block.

In some embodiments, the blocks includes a low melting temperature plastic such as high density polyethylene or low density polyethylene, which may be an upper layer, when the block is installed to form a walking surface. This may facilitate retreatment of the block. For example, the outer surface may be retreated after the blocks have been installed for a period of time to change the colour of the walking surface and/or to rejuvenate the UV coating by applying a new UV coating.

In accordance with this broad aspect, there is provided a method of molding a plastic block using a mold wherein one side of a mold forms an outer face of the plastic block, the method comprising;
 (a) placing a UV resistant material into a mold whereby the UV resistant material is on the side of the mold;
 (b) introducing plastic into the mold; and,
 (c) molding the plastic block,
 wherein the UV resistant material forms a coating on the outer face of the plastic block.

In any embodiment, the plastic may be introduced to the mold from a location above the UV resistant material.

In any embodiment, the plastic may be introduced to the mold by extrusion.

In any embodiment, step (c) may comprise compressing the plastic in the mold.

In any embodiment, the plastic may be subjected to a pressure in the mold at which the UV resistant material is only partially embedded in the outer face of the plastic block.

In any embodiment, the UV resistant material may have a thickness and the plastic may be subjected to a pressure in the mold at which up to 90% of the thickness of the UV resistant material is embedded in the outer face of the plastic block.

In any embodiment, the method may further comprise selecting the UV resistant material from sand, titanium dioxide, crushed glass, a metallic powder, pumice, a UV stabilized plastic, concrete particulate material and pebbles.

In any embodiment, the UV resistant material may comprise sand.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which.

Figure 1:
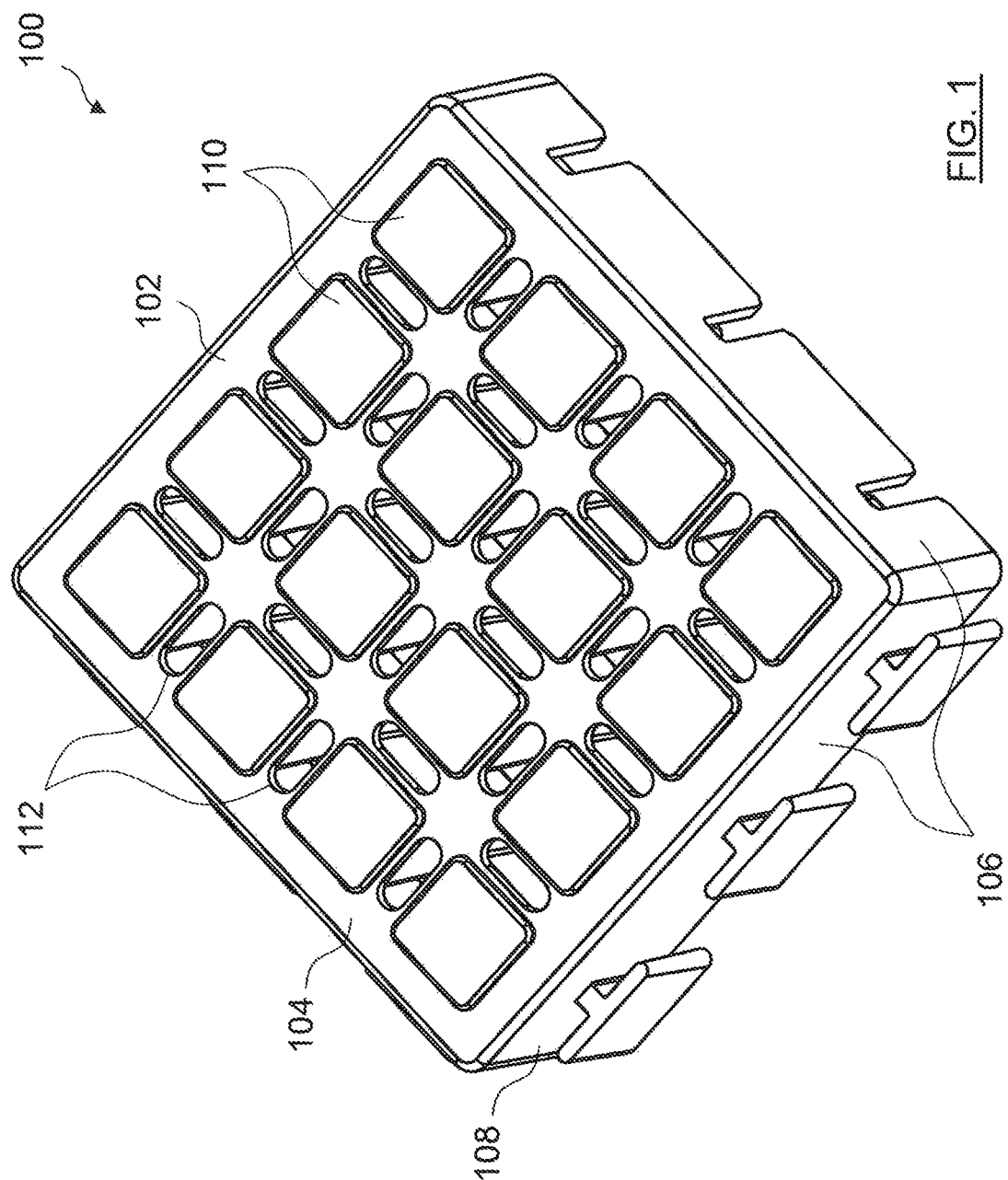
FIG. 1 is a top perspective view of a plastic block.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

Referring to FIG. 1, an exemplary embodiment of a plastic block is shown generally as 100. Plastic block 100 includes an outer face 102. In the illustrated example, outer face 102 is a face of top panel 104. A set of sidewalls 106 form a skirt 108 extending from the periphery of the top panel 104.

Figure 20:
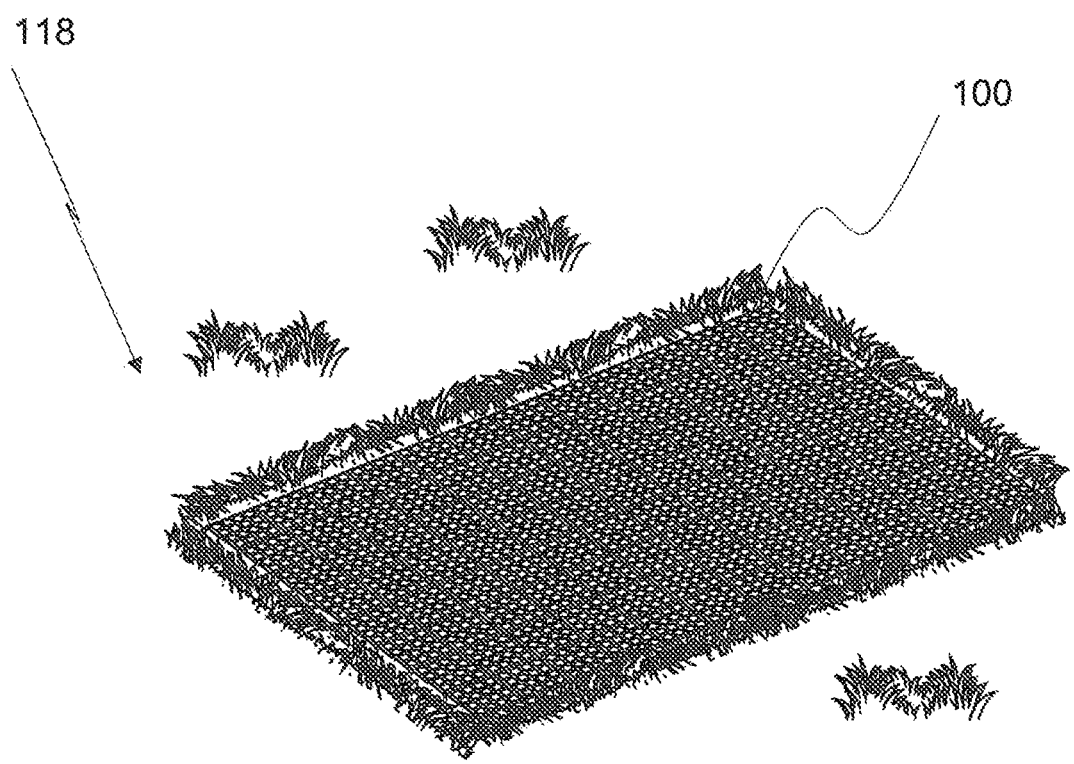

As exemplified in FIG. 20, a plurality of blocks 100 may be used to provide a walking surface 118 (such as a patio, a walkway around a pool, a sidewalk, etc.). It will be appreciated that the blocks 100 may be secured together by any means known in the art. As exemplified in FIG. 2, the illustrated example block 100 is rectangular and has four sidewalls. Block 100 includes male interlocking features 124 projecting from two sidewalls 106 and female interlocking features 126 formed in the other two sidewalls 106. Male and female interlocking features 124, 126 may be used to interlock block 100 with adjacent similarly-shaped blocks to form an array of blocks.

Figure 5:
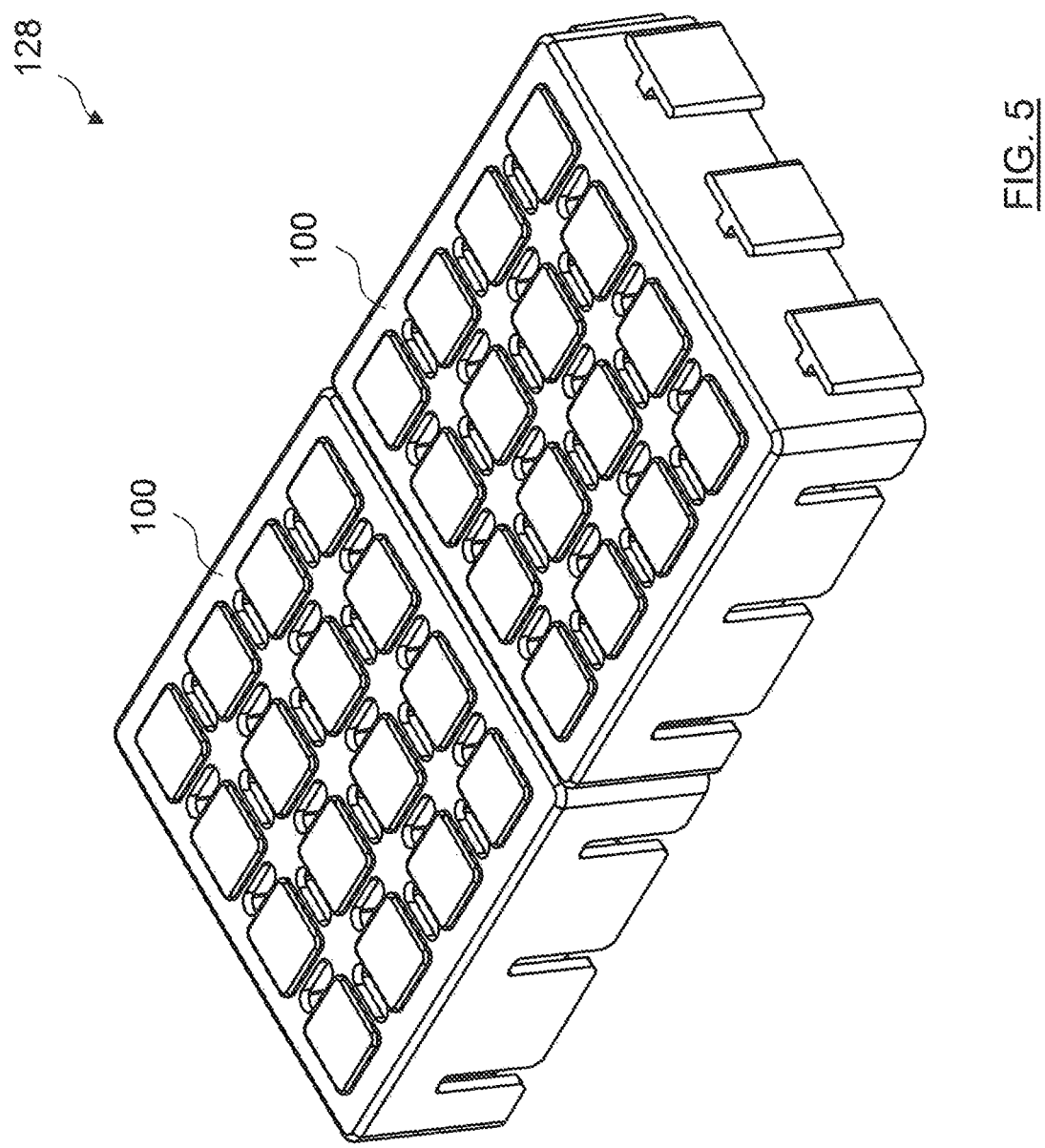
FIG. 5 is a top perspective view of an array of plastic blocks.
Figure 6:
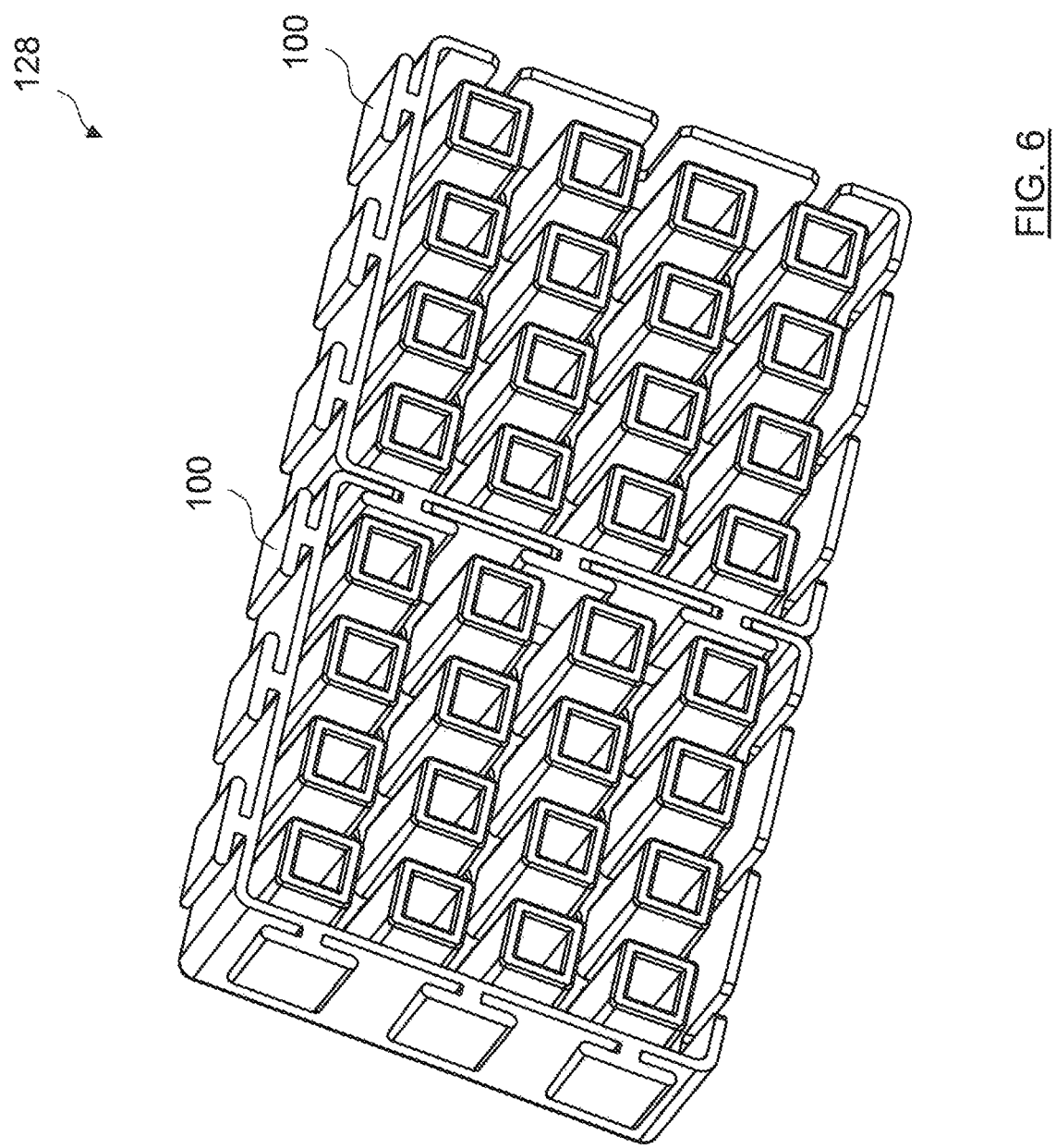
FIG. 6 is a bottom perspective view of the array of plastic blocks of FIG. 5.

Any number of blocks 100 may be used. As exemplified in FIGS. 5 and 6, an array 128 of blocks 100 may include two blocks. In the illustrated example two blocks 100 are interconnected, with male interlocking features 124 of one block directly coupled to female interlocking features 126 of the other block. It will be appreciated that further blocks 100 may be added to the edges of array 128 to increase the size of the array 128 and the available top surface. Additional blocks 100 may be attached using the same or a different method.

It will also be appreciated that the blocks 100 may be set into any surface that will support the blocks to provide a walking surface. The blocks 100 may be permanently positioned in the ground (e.g., by being set in cement) of they may be removable (e.g., the may be set in sand).

In other embodiments, another panel or wall or a combination of panels and/or walls may form an outer face of the blocks 100 when the blocks are installed. For example, a side wall of the blocks 100 may be exposed, e.g., if the blocks 100 are used to build a retaining wall of the like. In any such case, the outer wall or walls may be treated as disclosed herein.

The outer surface may have any desired profile. For example, if the block 100 is for use to form a walking surface 118, then all or the uppermost portions of the block (when installed) may have a planar surface. In the exemplified embodiment, top panel 104 includes a plurality of raised surface features or areas 110. In the illustrated example, raised areas 110 are rectangular projections. It will be appreciated that raised areas 110 may be provided, for example, for tactile or aesthetic purposes.

The raised areas 110 are vertically positioned above the remainder of outer face 102. As exemplified, optionally a plurality of drainage holes 112 distributed across the lower portion of outer face 102. Drainage holes may be openings that lead to an interior of block 100. Accordingly, when it rains, water may flow through the drainage holes 112 to travel through the walking surface 118 to the ground, thereby inhibiting the formation of puddles on walking surface 118.

Optionally, when installed, only the raised areas 110 may be visible. The remainder of the upper face 102 may be covered, e.g., with sand, soil or the like, so as to overlie the lower portion of upper surface 102 that has the drainage holes 112.

The interior 114 of block 100 may be of any design. If block 100 is to be load bearing (e.g. a walking surface 118), then the interior 114 may be constructed to provide support for the upper surface 102. Further, if drainage holes 112 are provided, then the interior 114 of the block may be configured to provide drainage channels to enable water to flow through drainage holes 112 and out the bottom of the block 100.

Figure 2:
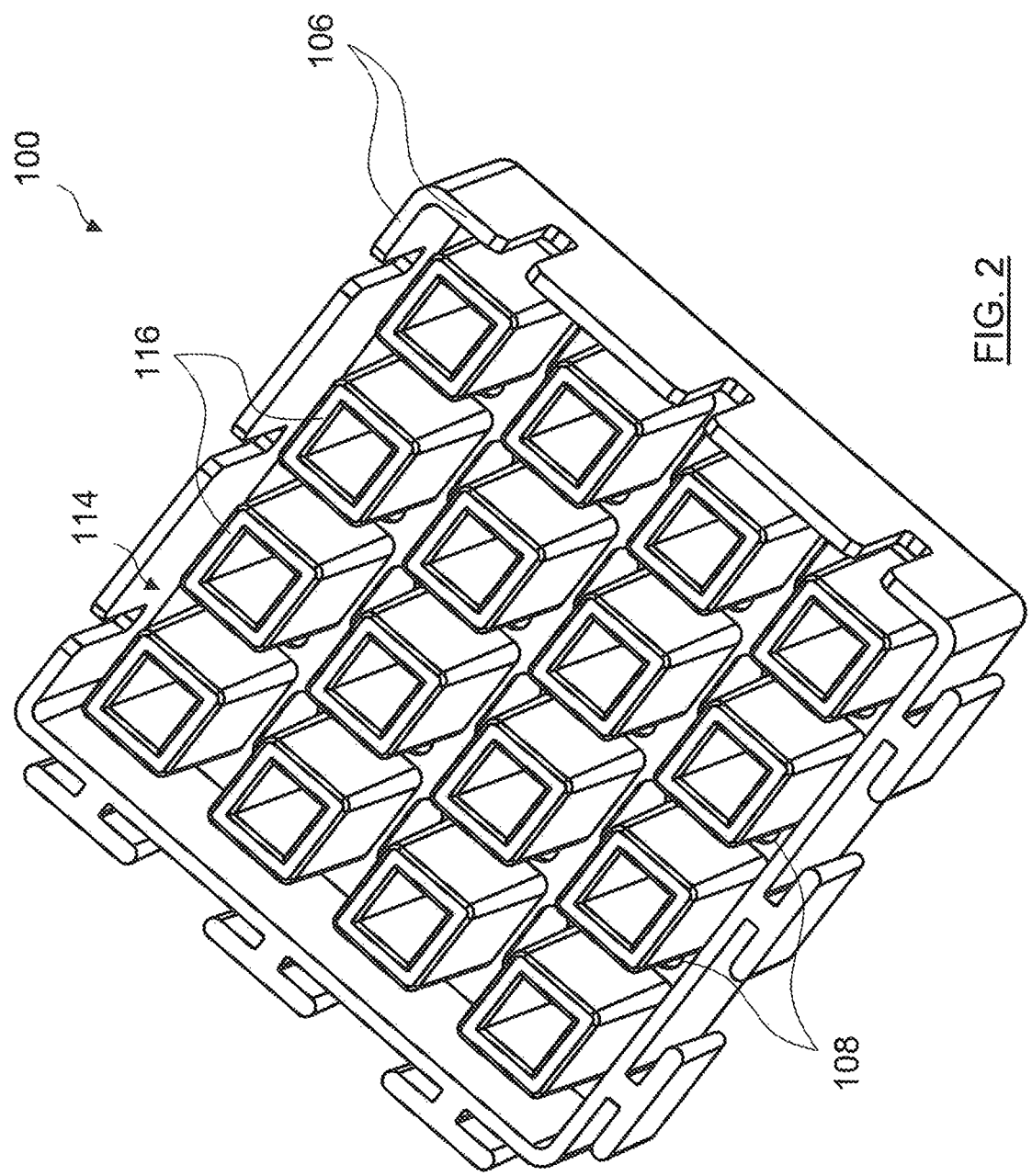
FIG. 2 is a bottom perspective view of the plastic block of FIG. 1.

As exemplified in FIG. 2, an interior 114 of block 100 is defined by sidewalls 106 and a plurality of internal supports 116 depending downwardly from the inner surface of top panel 104. In the example embodiment, a bottom of block 100 is open to allow easy drainage out of the interior 114. While internal supports 116 may be of any shape, they are exemplified as rectangular supports projecting from the inner surface or underside of top panel 104 and optionally are each opposite a surface feature 110. The internal supports 116 may be spaced apart to define flow channels for water. Also, when set in the ground, material, e.g., sand, may be received inside the channels between adjacent internal supports 116, as well as within internal supports 116 if internal supports 116 are hollow.

A coating 120 may be provided on outer face or faces of the block which are exposed once installed. In the illustrated examples, coating 120 is formed on a top of plastic block 100, however in other embodiments coating 120 may be formed on another outer face in addition to or in alternative to a top surface. For example, coating 120 may be formed on a bottom and/or side of plastic block 100.

Figure 3:
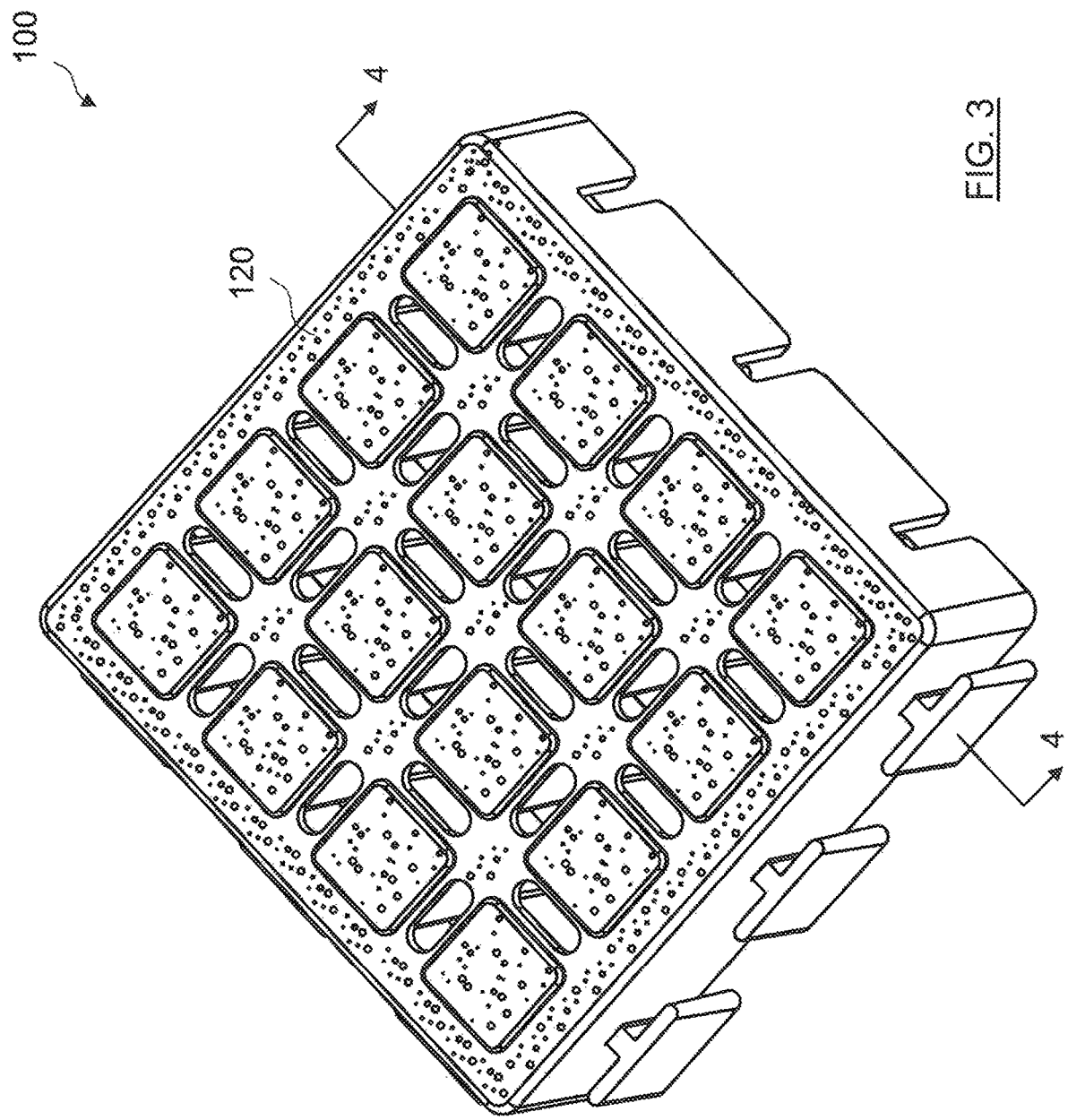
FIG. 3 is a top perspective view of the plastic block of FIG. 1, with a coating of UV resistant material applied to all upper surfaces.
Figure 7:
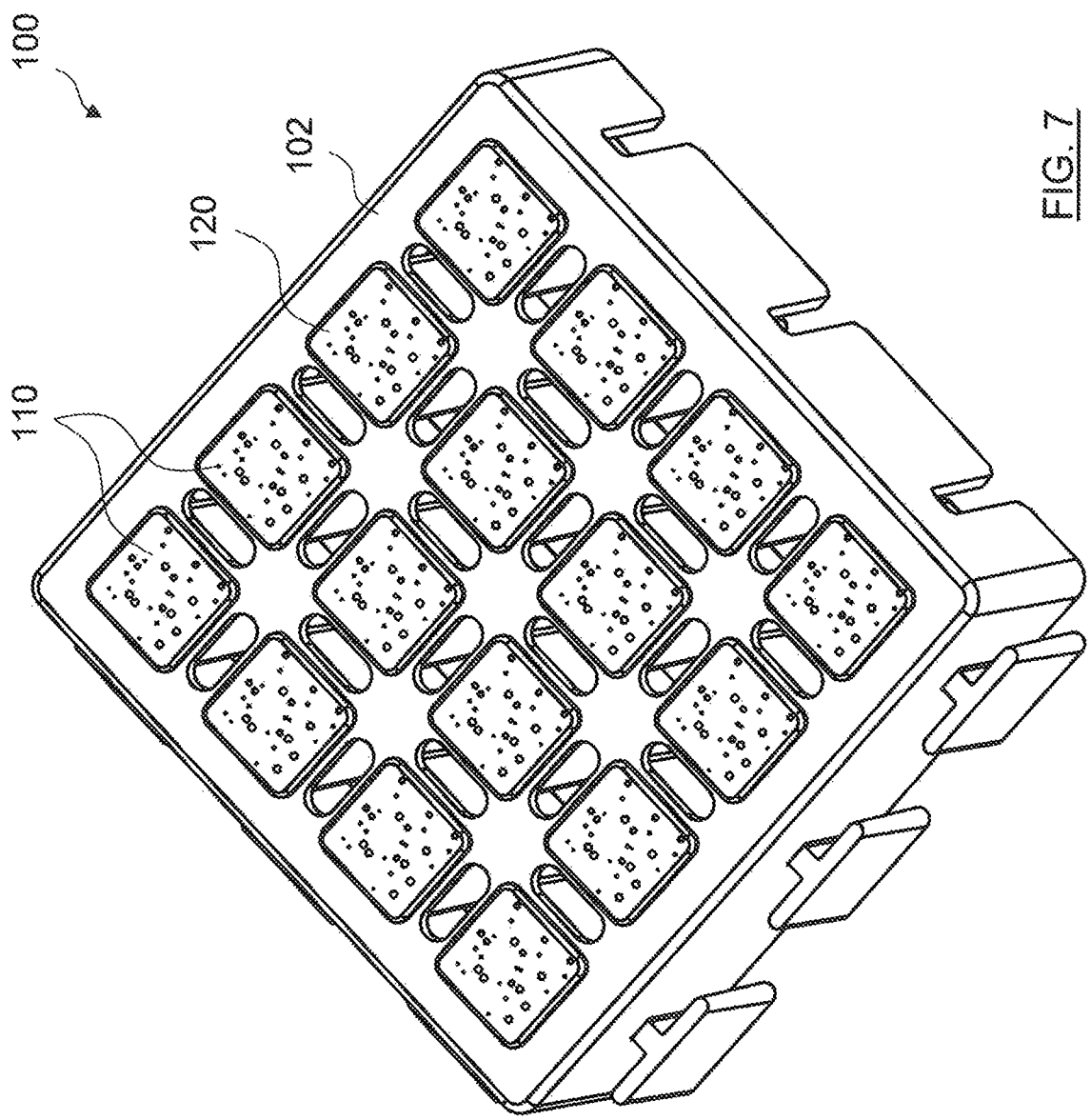
FIG. 7 is a top perspective view of the plastic block of FIG. 1, with a coating of UV resistant material applied only to the uppermost portions of the plastic block.

As exemplified in FIG. 3, coating 120 extends across the entire outer face 102 to protect the outer face 102, however in other embodiments a coating may coat only a portion of an outer face 102 or only a few areas of outer face 102. For example, as exemplified in FIG. 7, the UV resistant coating 120 is applied only to the raised areas 110. Optionally, coating 120 may only be applied to raised areas which are expected to be subject to a greater amount of UV radiation than surrounding areas and/or are to be exposed to a load (e.g., a person walking thereon). Accordingly, as exemplified in FIG. 7, coating 120 is applied to raised surface features 110.

Coating 120 includes a UV resistant material 108 that is provided on the outer surface(s) of plastic block 100. Examples of UV resistant material 108 include sand, titanium dioxide, crushed glass, a metallic powder, pumice, a UV stabilized plastic, concrete particulate material, pebbles, and fibers. Optionally, the UV coating comprises sand and one or more of titanium dioxide, crushed glass, a metallic powder, pumice, a UV stabilized plastic, concrete particulate material, pebbles, and fibers. Optionally, the UV coating consists essentially of or consists of sand.

Figure 4:
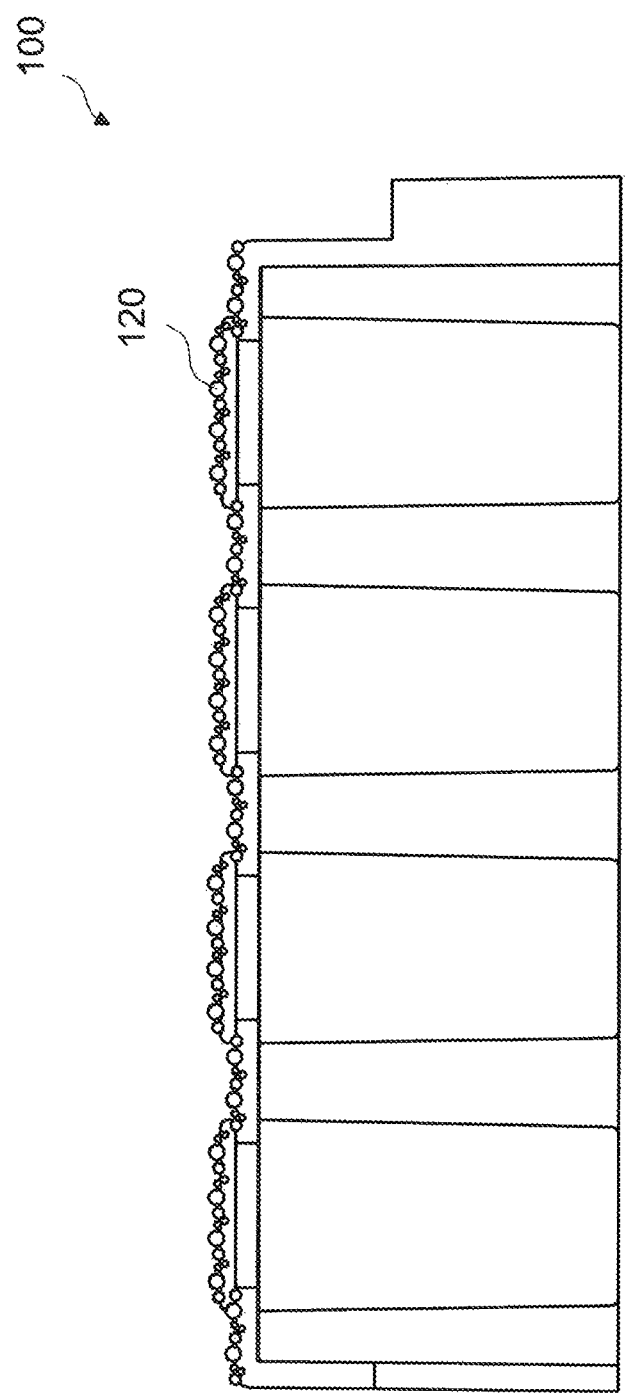
FIG. 4 is a cross-section view of the plastic block of FIG. 3, taken along line 4-4 of FIG. 3.

The coating 120 may be secured to the exposed face by various means. As exemplified in FIG. 4, the UV resistant material 108 is embedded in the exposed face (outer face 102) of block 100. While the UV resistant material 108 is embedded into the exposed face, it will be appreciated that part of the UV resistant material may be embedded into the material of block 100 and part may be positioned exterior to the exposed face. For example, 25%, 50% or 75% of the thickness of the UV resistant material 108 may be positioned internal of the material of the block 100 and the remainder may be positioned exterior thereto. Therefore, part of the material will remain visible and may form the outer exposed surface of block 100. In other embodiments, most or all of the UV resistant material 108 may be positioned into the exposed surface of the block 100.

A block 100 may be prepared (e.g., molded) as a single unitary structure. The entirety of the structure may be made of the same material (e.g., the block may have a homogeneous composition throughout). Alternately, only the exposed (e.g., upper) surface may be formed or a material designed to or capable of receiving the UV resistant material 108. For example, the block 100 may be made of, e.g., one or more of concrete, metal, a high melting point plastic, and the exposed surface may be provided with a layer which will receive the UV resistant material 108. For example, if the block is made of metal or concrete, then a layer of plastic may be provided to form part or all of the exposed surface. Alternately, if the block is made of a plastic, then a layer of lower melting point plastic may be provided to form part or all of the exposed surface.

Optionally, block 100 may comprise, consist essentially of or consist of one or more virgin plastic and/or one or more recycled plastic. In some embodiments, plastic block 100 includes a mix of two or more plastics each having a different melting temperature. In some embodiments, a temperature sufficient to melt plastic block 100 is a temperature sufficient to melt the plastic in a mix of plastics which has the highest melting temperature. In other embodiments, a temperature sufficient to melt plastic block 100 is a temperature sufficient to melt the plastic in a mix of plastics which has the lowest melting temperature or the lower melting temperatures.

As discussed previously, in some embodiments, block 100 may have a layer of plastic over a body of another material, and a temperatures sufficient to melt plastic block 100 is a temperature sufficient to melt the plastic layer. For example, a block 100 may have a body composed of metal or mixed plastic and a layer of virgin plastic for the exposed surface. An advantage of using virgin plastic is that it will have a known melting temperature.

In some embodiments, plastic block 100 includes a block body on which a plastic layer is applied as a coating, such as by spraying the block body with plastic layer when the plastic binder is in a heated and fluid state. UV resistant material 108 may be embedded in the plastic layer coating to form a coating of UV resistant coating 120 embedded in the plastic layer.

Plastic block 100 is illustrated as a patio paver. However plastic block 100 may also be formed in many other shapes. For example, plastic block 100 may be formed as a roof tile, roofing sheet, roofing shingle, evestrough, plastic window, skylight, siding, brick, block, interlocking brick, interlocking block, indoor flooring, water pipe, sewer pipe, electrical conduit, bumper, watercraft, hat, helmet, protective clothing, clothing, car body part, dock, railway tie, chock, speed bump, lumber, or furniture item. Outer face 102 may include any one or more surface of a block 100 that is exposed when installed.

Figure 8:
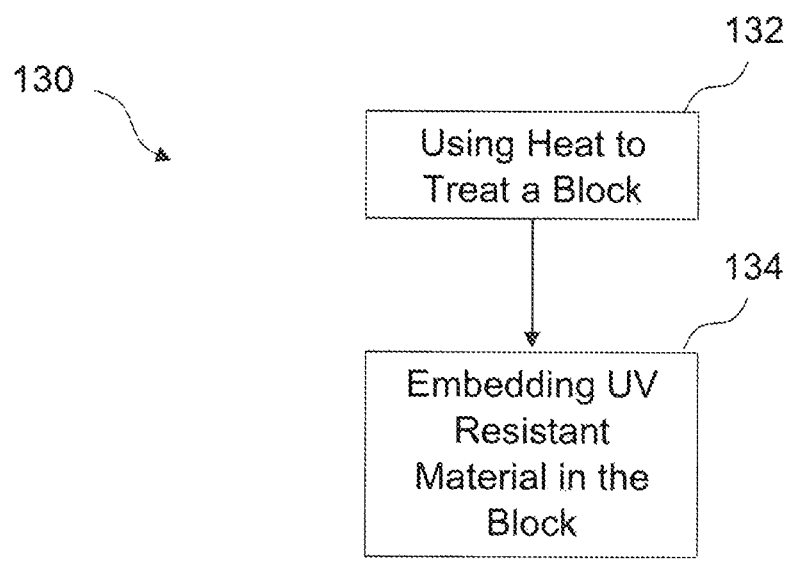
FIG. 8 is a flow diagram of a method of treating a plastic block using heat.

Various methods may be used to provide the UV resistant material 108. Several example methods are discussed subsequently. Optionally, as exemplified in FIG. 8, the method 130 comprises providing heat to an existing block (e.g., a block which has been installed) at step 132 to provide a layer of plastic that has softened to an extent such that the UV resistant material 108 may be applied thereto (step 134). Alternately, the UV resistant material 108 may be provided during the manufacture of a block 100 such that the UV resistant material 108 is provided only on the intended exterior face of the block 100 or not to the entirety of the material used to form the block 100.

The heat is optionally provided so as not to compromise the structural integrity of a block. For example, if the entirety of a block is heated, then the block may deform prior to or as the coating is applied. Alternately, or in addition, the block may shrink or deform in shape. Therefore, if a coating is applied to an existing block, optionally heat is provided essentially only to heat the portion of the block that is to receive the coating. Accordingly, in some embodiments, only an upper portion 140 of the plastic block, which comprises the outer face 102, is heated to a temperature about or above the melting point of the plastic block 100. For example, only the upper 5%, 10%, 15%, 20% of the thickness (height) of the plastic block 100, which comprises the outer face 102, may be heated to a temperature about or above the melting point of the plastic block.

Figure 9A:
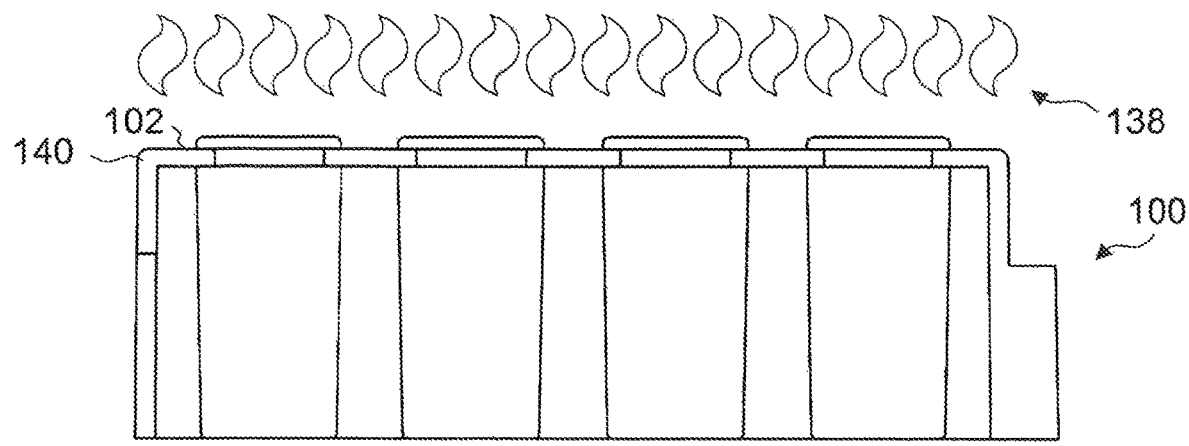
FIG. 9A is a schematic cross-section view of heat being applied to a plastic block.
Figure 9B:
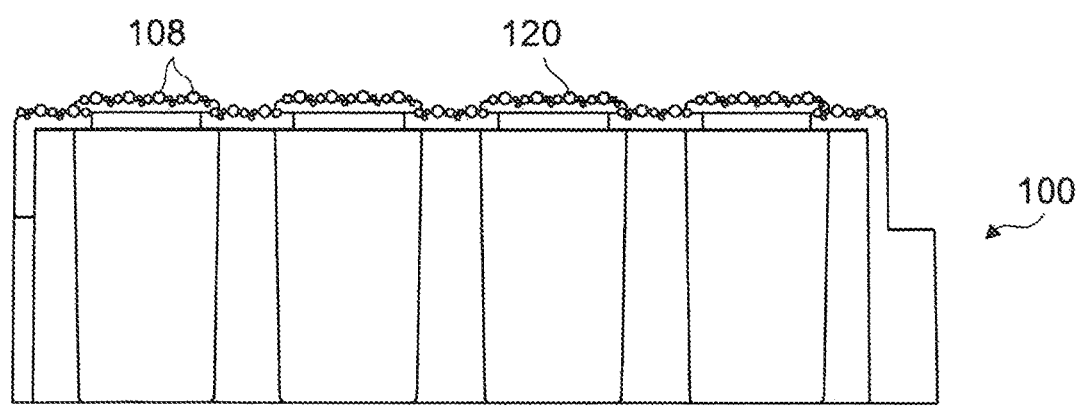
FIG. 9B is a schematic cross-section view of the plastic block of FIG. 9A coated with a coating of UV resistant material.

FIGS. 9A and 9B exemplify a method 130. Block 100 is shown in cross section. At step 132, an example of which is illustrated in FIG. 9A, heat 138 is used to treat block 100. In the illustrated example, heat 138 is applied to an outer face 102 of block 100. Applying heat 138 may include heating the outer face 102 to a temperature at which the UV resistant material 108 is embeddable in the outer face 102.

Heat 138 may be provided, directly to the block 100 itself, or to a material that is then used to heat the block 100. For example, heat may be applied to the block by exposing the block to an infrared source, an electric heater, and/or a flame. In some embodiments, heat is provided by a chemical reaction adjacent the UV resistant material 108, such as by mixing the UV resistant material with a reactant mixture. For example, sand may be mixed with iron powder and/or other materials, and a heat-releasing reaction triggered to heat the UV resistant material 108 and/or the outer face 102 if the reaction takes place on or adjacent the outer face 102. Alternately, the coating material itself may be heated and therefore, the coating material may itself be the agent that is used to heat the block.

In some embodiments, heating the outer face 102 includes heating to a temperature at which the UV resistant material 108 is embeddable in the outer face 102 but below the melting point of the plastic block 100. For example, the outer face 102 may be heated to a temperature which is from, e.g., 40° C. to 5° C., 30° C. to 5° C., 30° C. to 10° C. below the melting point of the plastic block. In other embodiment, the upper portion may be heated to a temperature above the melting point, e.g., 5, 10, 15, 20, 25° C. above the melting point of the plastic block.

Optionally, to heat only the upper portion 140 of the block 100, the heat may be applied rapidly. The length of time during which heat is applied will depend, inter alia, on the temperature of the heat source, the melting point of the upper portion and the proximity of the heat source to the upper surface. For example, the upper surface may be heated to a desired embedding temperature in 5, 10 or 15 seconds or less.

Heat 138 may result in a softened outer face 102 of plastic block 100 which may facilitate embedding a UV resistant material 108 into the outer face 102 of the plastic block 100. For example, less force may be required to embed UV resistant material 108 in a softened outer face 102 than would be required to embed UV resistant material 108 in an unsoftened outer face 102.

At step 134, an example of which is illustrated in FIG. 9B, UV resistant material 108 is then embedded is the outer face 102 of block 100. In some embodiments, step 134 includes providing the UV resistant material 108 on the outer face 102 once the outer face 102 has been heated to a temperature at which the UV resistant material is embeddable in the outer face. Once embedded, the UV resistant material 108 provides a coating 120 on the outer face 102.

Figure 10A:
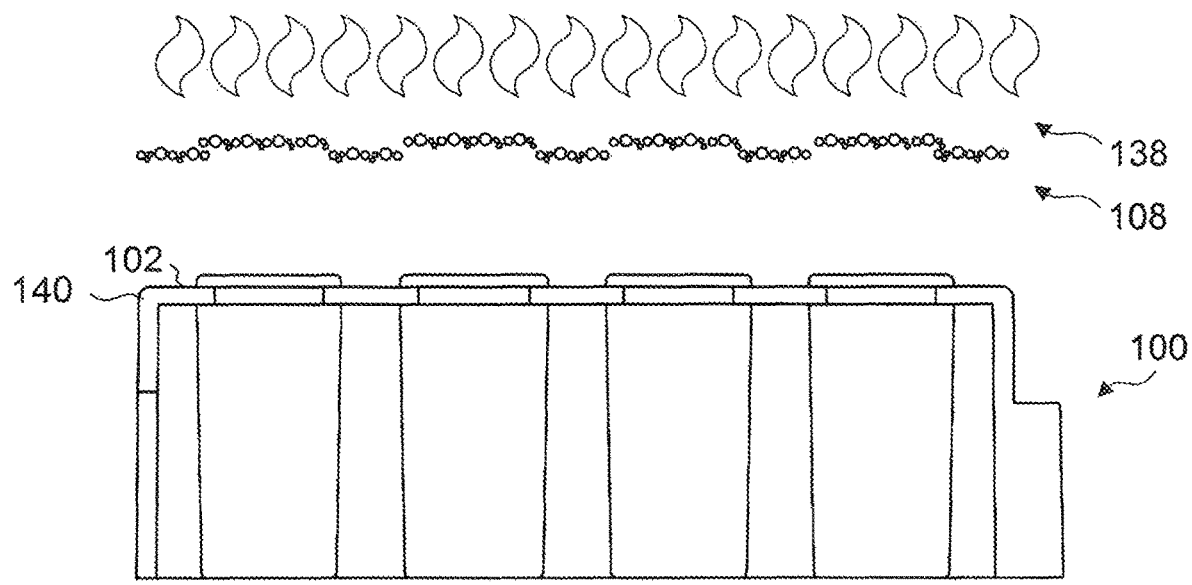
FIG. 10A is a schematic cross-section view of heat being applied to UV resistant material, which is to be embedded in a plastic block.
Figure 10B:
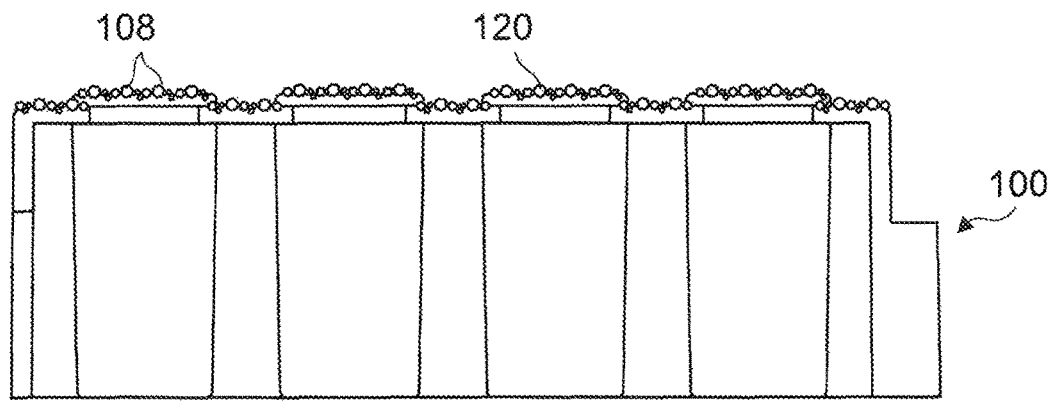
FIG. 10B is a schematic cross-section view of the plastic block of FIG. 10A coated with a coating of UV resistant material.

FIGS. 10A and 10B exemplify an alternative example of method 130 wherein the UV resistant material 108 is heated and the heated UV resistant material 108 is used to heat the upper surface of block 100. As illustrated in FIG. 10A, the UV resistant material 108 is heated to obtain heated UV resistant material 108. As illustrated in FIG. 10B, at steps 132 and 134 the heated UV resistant material is provided to the outer face and is embedded in outer face 102 to provide a coating 120.

While FIG. 10A illustrates UV resistant material 108 heated prior to being provided to outer face 102, UV resistant material may also or alternatively be heated as it is being provided to outer face 102 or after being provided to outer face 102. For example, in some embodiments UV resistant material 108 may be dropped onto outer face 102 and may pass through a heated space as it falls between a dispensing point and a point of contact with outer face 102.

In some embodiments UV resistant material 108 is heated to between 10° C. and 200° C., 10° C. and 100° C., 20° C. and 75° C., 30° C. and 60° C. above the melting point of the outer face 102. In some embodiments, supplying heat to outer face 102 during or before providing the UV resistant material may allow a lower temperature UV resistant material 108 to be used.

In some embodiments, block 100 may be carried on a conveyor under a dispensing location. UV resistant material 108 may be dispensed from the dispensing location and may fall through a heated space onto block 100 as block 100 passed beneath. In some embodiments, excess UV resistant material is gathered from around or on the conveyor and returned to the dispensing location to be re-dispensed.

In some embodiments the heated UV resistant material 108 provides at least 75% of the heat, and in some embodiments the heated UV resistant material 108 provides all or at least substantially all of the heat.

It will be appreciated that concurrently with, or subsequent to, providing the UV resistant material to the block 100 (whether the block 100 is heated prior to, during or subsequent to the UV resistant material being provided to the exposed surface of the block 100), the block 100 with the UV resistant material may be subjected to a compressive force so as to embed the UV resistant material into the exposed surface.

For example, the UV resistant material may be conveyed at a speed (under force) to the exposed surface such that the UV resistant material will be embedded into the exposed surface.

Figure 11:
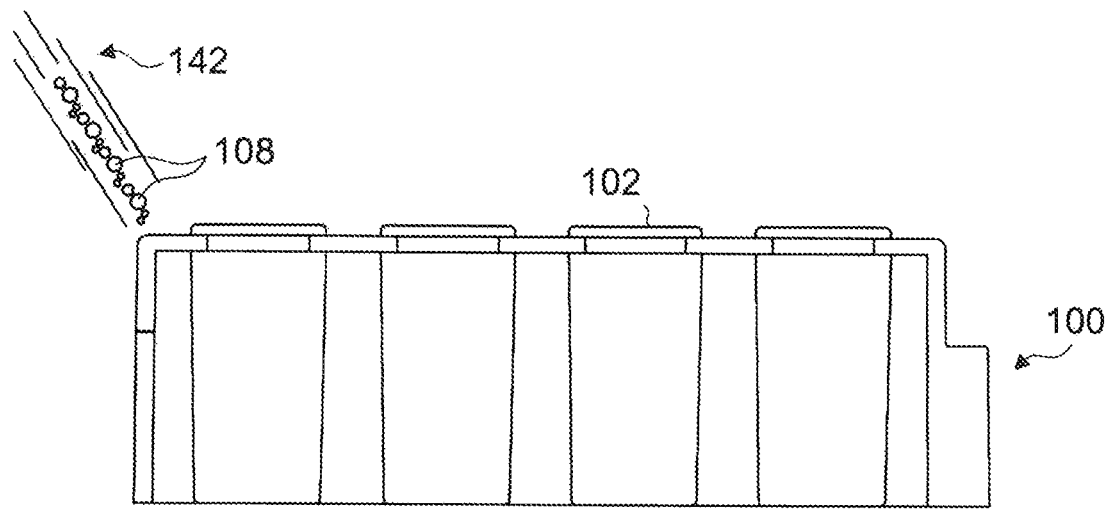
FIG. 11 is a schematic cross-section view of UV resistant material conveyed by an air stream to a plastic block.

As exemplified in FIG. 11, the UV resistant material 108 may be conveyed pneumatically (by an air stream 142) to the outer face. For example, an air stream 142 may be produced by a compressed gas. In some embodiments, an air stream 142 may be used to draw UV resistant material 108 from a supply container using, e.g., a venturi system in which air stream 142 is directed past an opening in the supply container. In some embodiments, heat 138 is supplied to the UV resistant material 108 as the material 108 is carried in air stream 142.

Figure 12:
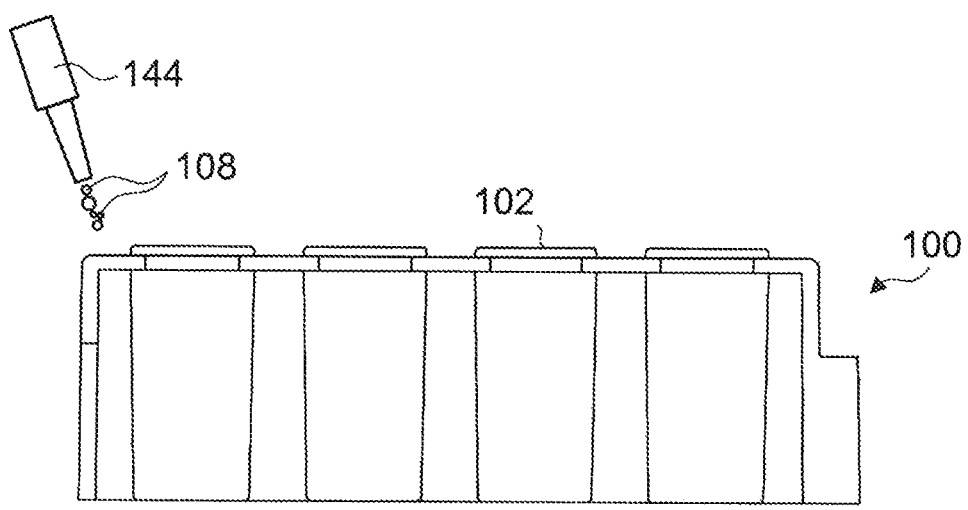
FIG. 12 is a schematic cross-section view of UV resistant material ejected by an apparatus towards a plastic block.

As exemplified in FIG. 12, the UV resistant material 108 may be ejected from an apparatus 144 towards the outer face 102. In the illustrated example, apparatus 144 is a nozzle. However, other apparatus 144 may also be used. For example, apparatus 144 may be a spinning disk on which UV resistant material 108 is placed, and the UV resistant material 108 may then be ejected from off an edge of the disc towards an outer face 102 of block 100. In some embodiments, heat 138 is supplied to the UV resistant material between apparatus 144 and block 100.

In some embodiments, a block 100 may be moving relative to a supply of UV resistant material 108. For example, a block may be on a moving belt while a stream of UV resistant material 108 is ejected from a stationary apparatus 144 above or beside block 100. In some embodiments, UV resistant material 108 may be provided across an entire width of an outer face 102 of a moving block 100 so that the entire face 102 is coated as block 100 moves through the supply of UV resistant material 108.

Figure 13:
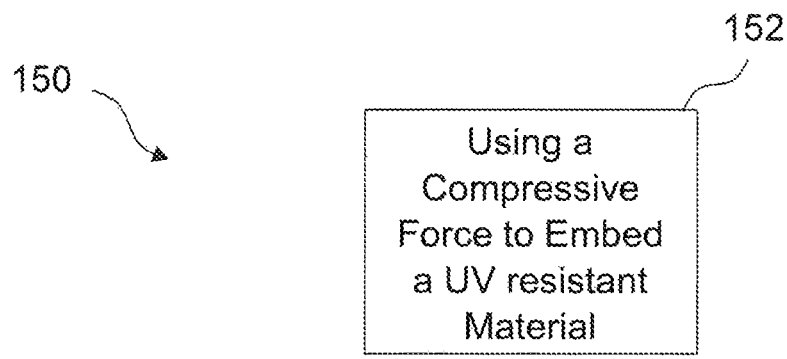
FIG. 13 is a flow diagram of a method of treating a plastic block using compressive force.
Figure 14:
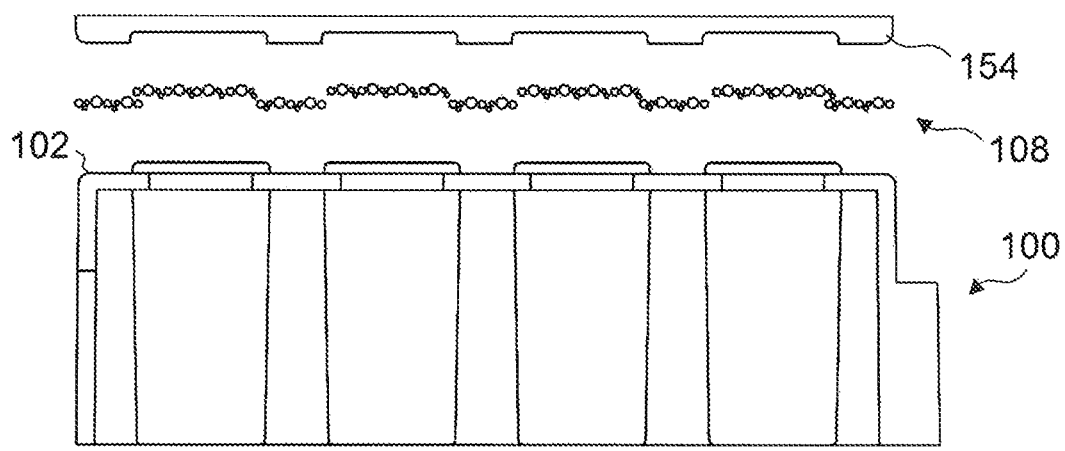
FIG. 14 is a schematic exploded cross-section view of UV resistant material compressively applied to a plastic block.

Alternately, or in addition, a compressive force may be applied to embed, or assist in embedding the UV resistant material 108 into the outer face once the UV resistant material 108 has been provided to the outer face. Accordingly, FIG. 13 exemplifies a method 150 for treating a plastic block 100 comprises using, at step 152, a compressive force to embed a UV resistant material into an outer face 102 of the plastic block wherein, once embedded, the UV resistant material 108 provides a coating 120 on the outer face 102. As exemplified in FIG. 14, a pressure surface 154 may be used to provide a compressive force to press UV resistant material 108 into face 102.

Figure 15:
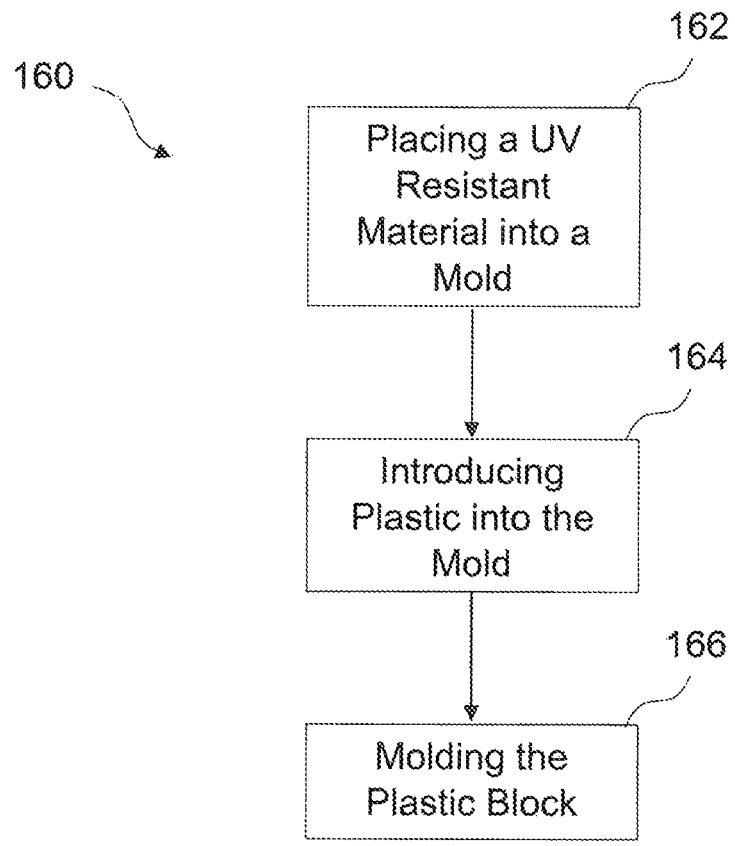
FIG. 15 is a flow diagram of a method of molding a plastic block.

Alternately, the UV resistant material 108 may be incorporated into a block 100 as the block is formed. FIG. 15 exemplifies a method 160 of molding a plastic block 100 wherein one side of a mold forms an outer face 102 of the plastic block 100.

Method 160 includes placing a UV resistant material into a mold at step 162, whereby the UV resistant material 108 is on the side of the mold that forms the outer face. Method 160 includes introducing plastic into the mold at step 164, molding the plastic block at step 166 such that the UV resistant material 108 forms a coating 120 on the outer face 102 of the plastic block 100 (e.g., it is the outer face of the block 100 as the block is removed from the mold).

Figure 16A:
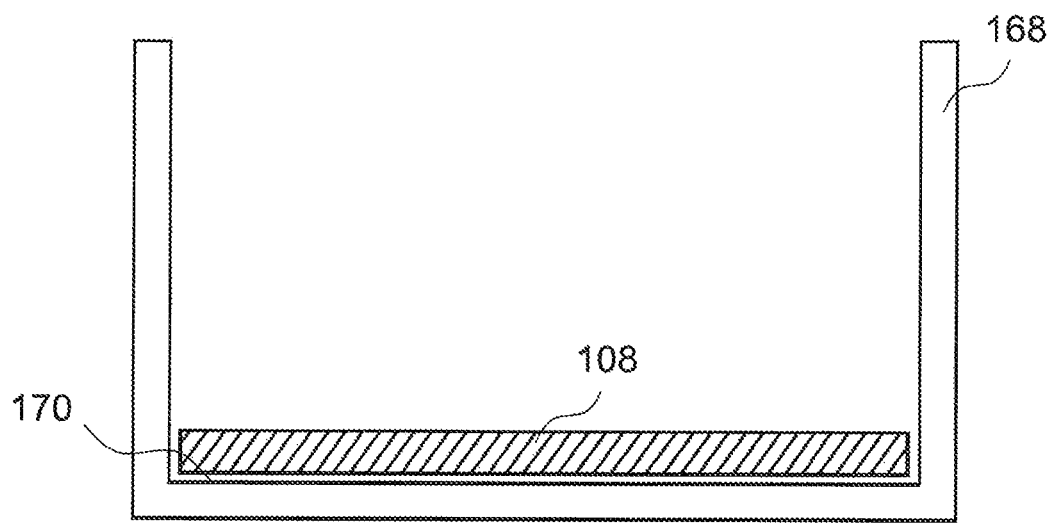
FIG. 16A is a schematic cross-section view of a mold containing UV resistant material.
Figure 16B:
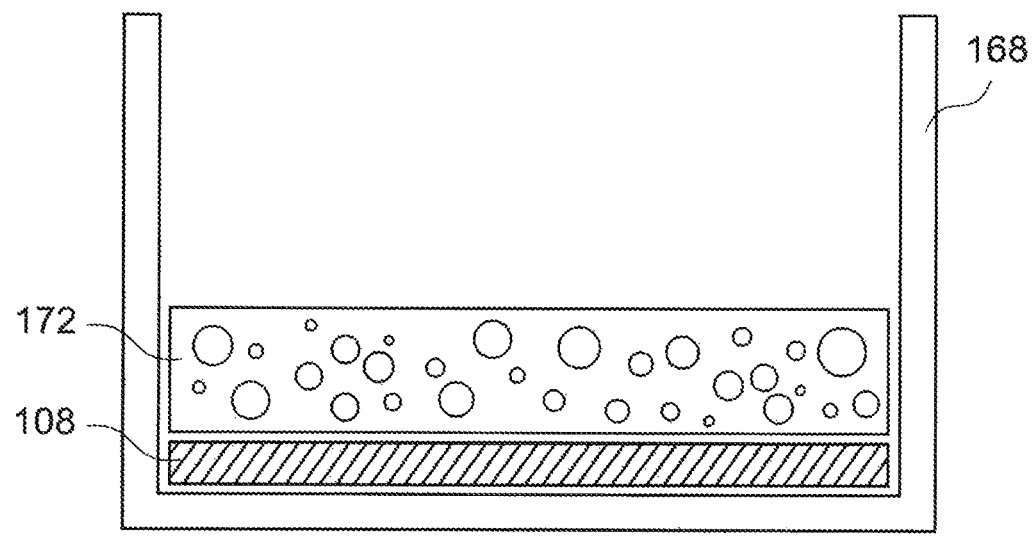
FIG. 16B is a schematic cross-section view of the mold of FIG. 16A containing UV resistant material and plastic.

Referring to FIG. 16A, in an example embodiment method 160 includes placing UV resistant material 108 into mold 168, such as a steel mold 168. UV resistant material 108 is on a side 170 of mold 168. In the illustrated example, side 170 is a floor of mold 168. Referring to FIG. 16B, plastic 172 is introduced into the mold 168. Optionally, the plastic is placed into the mold (poured, injected into, etc.) so as to not mix the UV resistant material 108 with all of the plastic introduced into the mold. For example, as exemplified, plastic 172 may be introduced to the mold 168 from a location above the UV resistant material. For example, plastic granules may be dropped into the mold 168 through an opening in the upper portion of the mold 168 to fall onto the UV resistant material 108 on the floor 170 of the mold 168.

The plastic block 100 is then molded with the UV resistant material 108 forming a coating 120 on an outer face 102 of the plastic block 100. For example, mold 168 may include two or more mold portions which together form a chamber shaped to form block 100. Mold 168 may also include a sprue through which plastic 170 may be injected in a heated fluid state into the chamber to be cooled into block 100. In some embodiments, UV resistant material 108 may be placed in the mold 168 prior to injection of plastic 170, and a sprue may be above the UV resistant material 108 in the mold 168. Mold 168 may then open to allow the block 100 to be ejected by mold 168 or otherwise removed.

During the molding process, pressure may be applied to the interior of the mold, such as by the plastic or other fluid being injected into the mold through the sprue (a compression packing cycle) or by inward movement of one or more mold members.

Figure 17A:
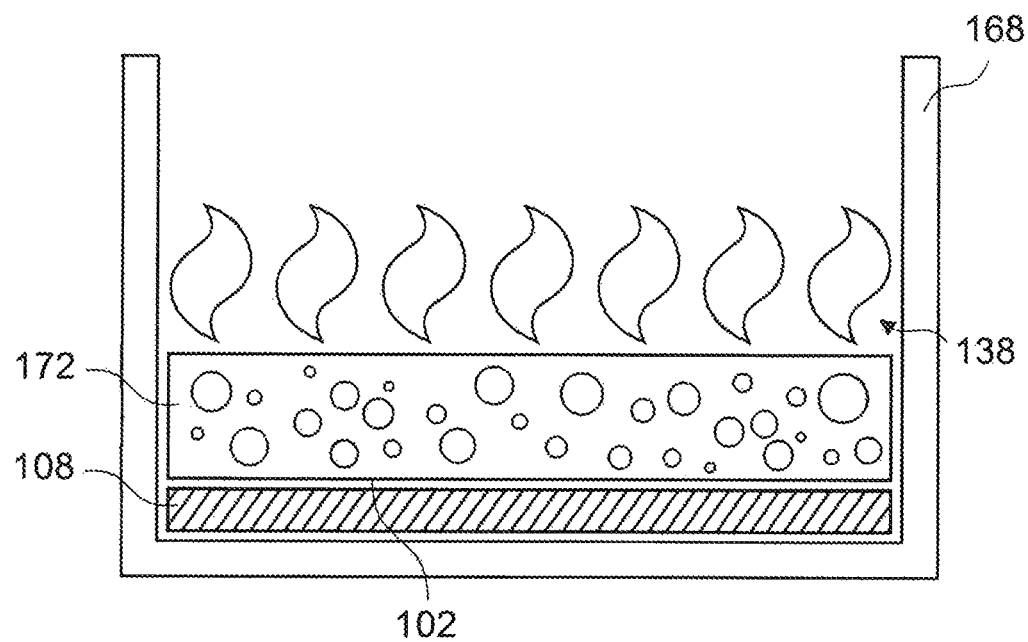
FIG. 17A is a schematic cross-section view of a mold containing UV resistant material and plastic to which heat is being applied.
Figure 17B:
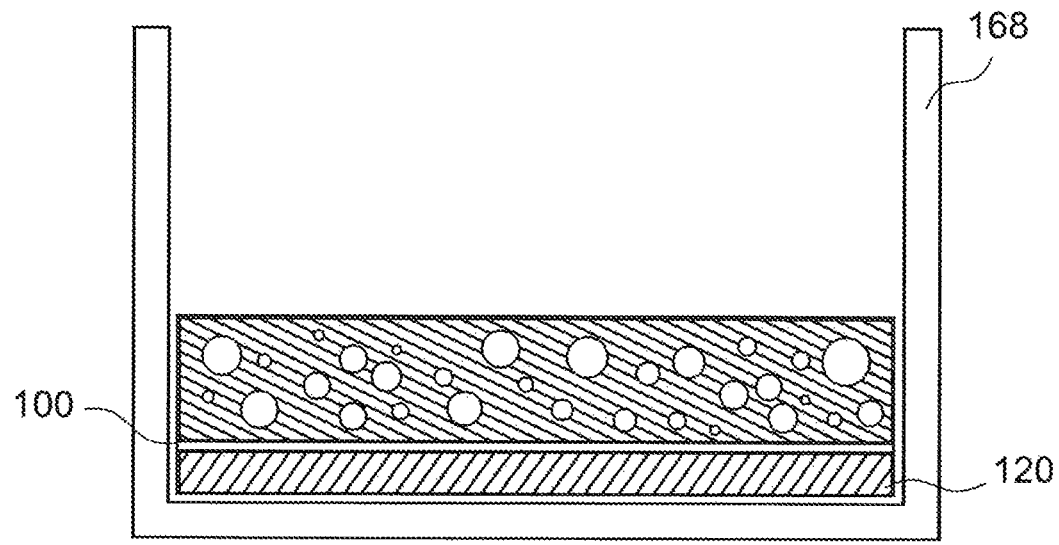
FIG. 17B is a schematic cross-section view of the mold of FIG. 17A containing a coated plastic block.

Prior to or concurrently with the plastic in the mold being compressed, heat may be applied, as exemplified in FIGS. 17A and 17B. For example, where plastic 172 in mold 168 is a powdered or granular plastic, applying heat may melt the plastic 172 which may then flow over UV resistant material 108 before being cooled sufficiently to be removed from mold 168. Compression may be applied prior to, during or after the heating cycle. Cooled plastic block 100 may then be removed from mold 168 and hardened.

In the embodiment illustrated in FIGS. 17A and 17B, heat 138 is applied to plastic 172 in the mold 168. However in other embodiments heat 138 may be used in other ways. For example, heat 138 may be applied to UV resistant material 108 prior to the introduction of plastic 172 into mold 168. In some embodiments, mold 168 is heated and heat is transferred from mold 168 to the contents of mold 168. Alternately, or in addition, the plastic may be heated if injection molding is used.

Figure 18:
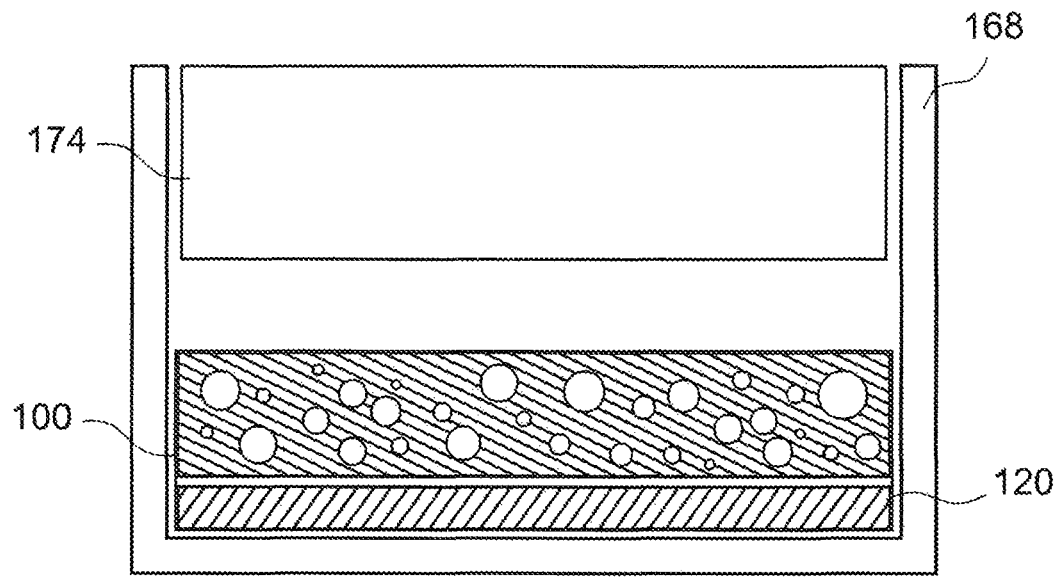
FIG. 18 is a schematic cross-section view of a compression mold containing a plastic block having a face coated with a UV resistant material.

Referring to FIG. 18, in the illustrated example molding the plastic block 100 includes compressing the plastic 172 in the mold 168 instead of or in addition to treating the plastic 172 with heat 138. For example, method 160 may include subjecting the plastic 172 to a pressure in the mold 168 at which the UV resistant material 108 is only partially embedded in the outer face 102 of the plastic block 100. The pressure to which the plastic 172 is subjected in the mold may be a pressure at which, e.g., up to 90% of the thickness of the UV resistant material is embedded in the outer face 102 of the plastic block 100.

In the illustrated example, pressure is applied by way of compression member 174. Compression member 174 may be moved into mold 168 to compress the contents of mold 168 and then withdrawn from mold 168, such as to facilitate removal of the compressed contents of mold 168. Compression member 174 is illustrated as a punch member, but in other embodiments other compression members, such as rollers, may be used.

Figure 19:
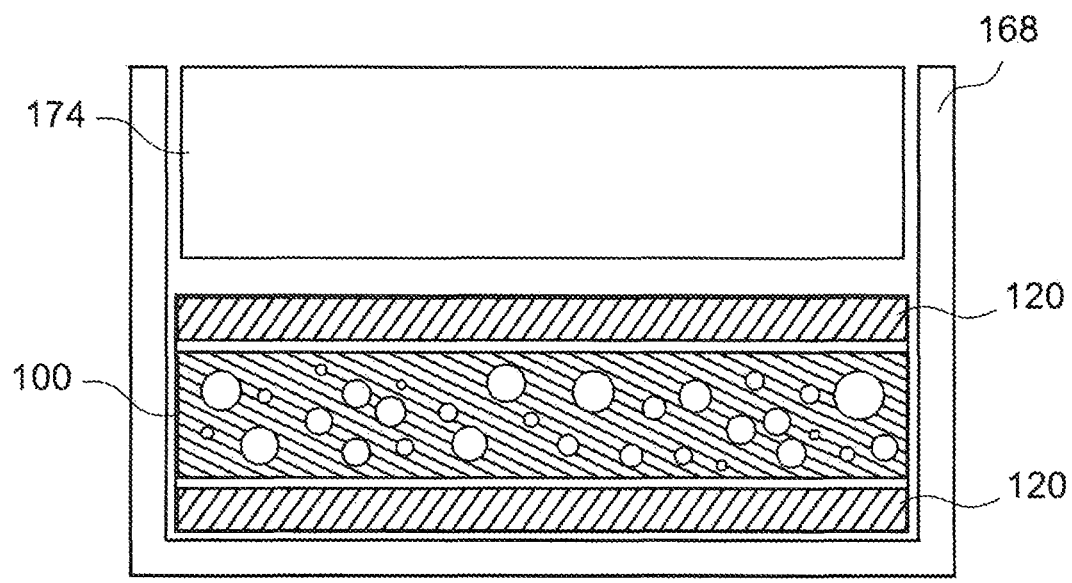
FIG. 19 is a schematic cross-section view of a compression mold containing a plastic block having two faces coated; and,
FIG. 20 is a top perspective view of walking surface made from a plurality of coated plastic blocks.

Referring to FIG. 19, in some embodiments a coating 120 may also be applied to a second outer face 102 of block 100. For example, once block 100 has been formed the second outer face 102 may be heated and UV resistant material provided on the second outer face 102 and the compression member 174 used to recompress block 100 to form a block 100 having two surfaces coated with coating 120.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method of treating a plastic patio paver block wherein the patio paver block comprises a top panel having sidewalls depending downwardly from a periphery of the top panel and internal support depending downwardly from an inner face of the top panel, the method comprising providing a pre-formed patio paver block and subsequently using heat to embed a granular UV resistant material into an outer face of the top panel of the plastic patio paver block wherein, once embedded, the granular UV resistant material provides a coating on the outer face.

2. The method of claim 1, wherein the outer face is first heated to a temperature at which the granular UV resistant material is embeddable in the outer face and then the granular UV resistant material is embedded into the outer face.

3. The method of claim 2, wherein the granular UV resistant material is provided on the outer face once the outer face has been heated to a temperature at which the granular UV resistant material is embeddable in the outer face.

4. The method of claim 2 wherein the outer face is heated to a temperature at which the granular UV resistant material is embeddable in the outer face but below the melting point of the plastic patio paver block.

5. The method of claim 4 wherein the outer face is heated to a temperature which is from 40 to 5° C. below the melting point of the plastic patio paver block.

6. The method of claim 1 wherein only the upper portion of the plastic patio paver block, which comprises the outer face, is heated to a temperature about or above the melting point of the plastic patio paver block.

7. The method of claim 6 wherein only the upper 10% of the height of the plastic patio paver block, which comprises the outer face, is heated to a temperature about or above the melting point of the plastic patio paver block.

8. The method of claim 6 wherein the upper portion of the plastic patio paver block is subjected to heating for up to 10 seconds to heat the upper portion to a temperature about or above the melting point of the plastic patio paver block.

9. The method of claim 6, wherein the granular UV resistant material is provided on the outer face once the outer face has been heated.

10. The method of claim 1 wherein the granular UV resistant material is heated to obtain heated granular UV resistant material and providing the heated granular UV resistant material to the outer face.

11. The method of claim 10 wherein the heated granular UV resistant material provides at least 75% of the heat.

12. The method of claim 10 wherein the heated granular UV resistant material provides at least substantially all of the heat.

13. The method of claim 10 wherein the granular UV resistant material is heated by passing through a heated space after being dispensed from a dispensing location and before reaching the outer face.

14. The method of claim 1 wherein the granular UV resistant material is pressed into the outer face.

15. The method of claim 14 wherein the granular UV resistant material is delivered under force to the outer face.

16. The method of claim 15 wherein the granular UV resistant material is conveyed by an air stream to the outer face.

17. The method of claim 16 wherein the air stream is produced by a compressed gas.

18. The method of claim 16, wherein the air stream is used to draw the granular UV resistant material from a supply container into the air stream to be conveyed to the outer face.

19. The method of claim 15 wherein the granular UV resistant material is ejected from an apparatus towards the outer face.

20. The method of claim 1 further comprising selecting the granular UV resistant material from sand, titanium dioxide, crushed glass, a metallic powder, pumice, a UV stabilized plastic, concrete particulate material and pebbles.

21. The method of claim 1 wherein the granular UV resistant material comprises sand.

22. The method of claim 1 further comprising using compressive force to embed the granular UV resistant material into the outer face of the plastic patio paver block.

* * * * *